United States Patent
Lowman

[11] 3,886,556
[45] May 27, 1975

[54] MULTICHANNEL DIRECTION FINDING RECEIVER SYSTEM

[75] Inventor: Roderic V. Lowman, Greenlawn, N.Y.

[73] Assignee: The United States of America as represented by the Secretary of the Air Force, Washington, D.C.

[22] Filed: Apr. 22, 1963

[21] Appl. No.: 274,876

[52] U.S. Cl............................. 343/119; 343/113 R
[51] Int. Cl............................................. G01s 3/28
[58] Field of Search ........... 343/113, 119; 325/304, 325/307

[56] References Cited
UNITED STATES PATENTS
2,234,587  3/1941  Budenbom.................... 343/119 X Primary Examiner—Maynard R. Wilbur
Assistant Examiner—Richard E. Berger
Attorney, Agent, or Firm—George Fine

EXEMPLARY CLAIM

2. A non-scanning multichannel direction finding receiver system to determine the direction of the source of an incoming radiant energy signal comprising a master channel including an antenna receiving said incoming radiant energy signal, said master channel operating to amplify and single sideband modulate said incoming radiant signal, and a multiplicity of receiver channels, each of said receiver channels including a mixer connected to an associated antenna to receive said incoming radiant energy signals, said single sideband modulated signal also being received by each of said mixers.

6 Claims, 1 Drawing Figure

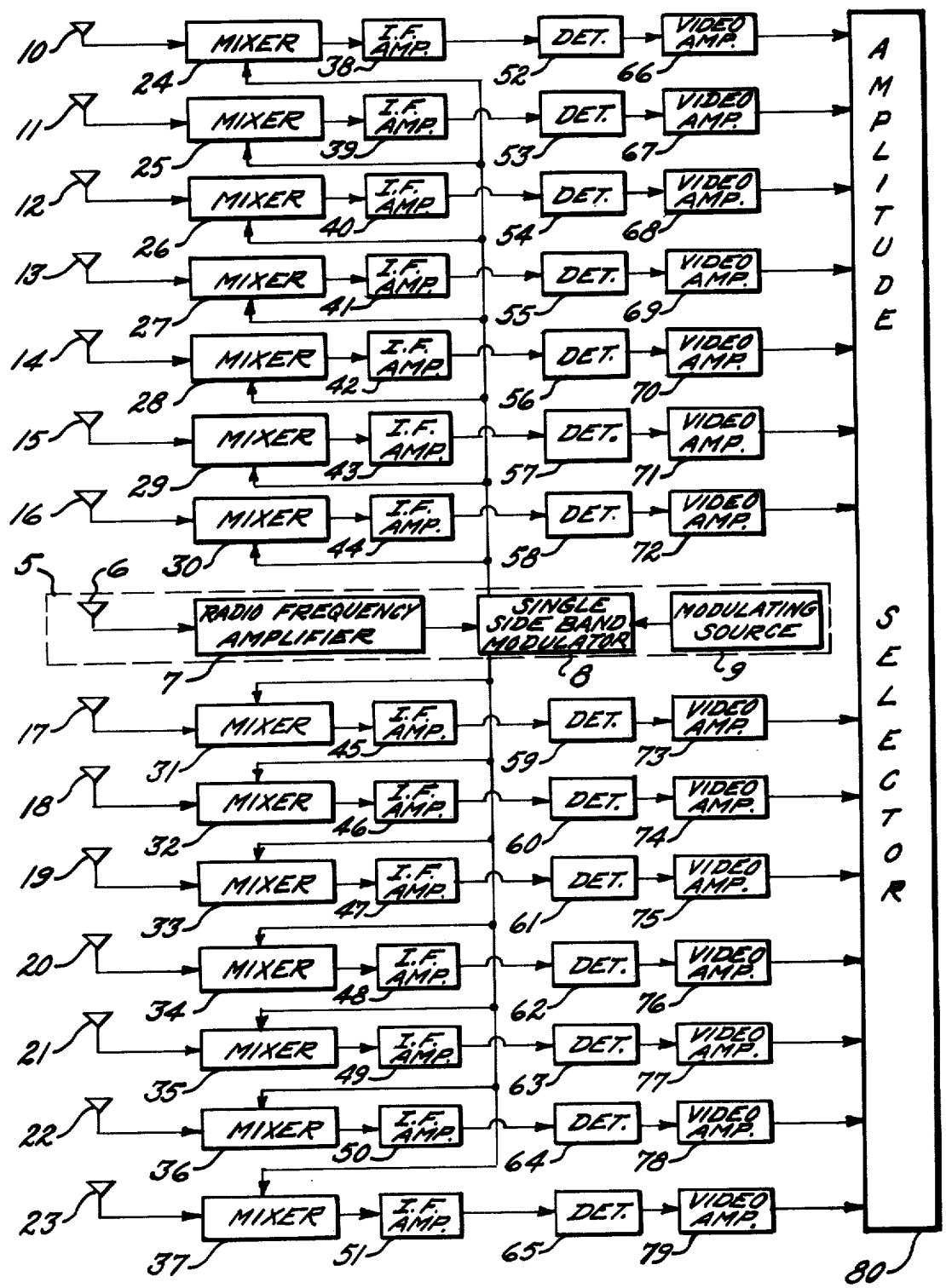

MULTICHANNEL DIRECTION FINDING RECEIVER SYSTEM

This invention relates to a direction finding system, and more particularly to a multichannel non-scanning direction finding system having a multiplicity of receiver channels and a single master channel generating a local oscillator signal for each receiver channel.

It is desirable and necessary to determine and find the direction of a radiant energy source. For example, the point of origin of a radar signal may be of substantial importance for the purposes of guidance of homing. Or in another instance, the location and direction of the source of a signal may be useful for navigation purposes. Various systems have been developed in order to accomplish direction finding. One of the most desirable systems, particularly in the area of radar signal direction finding, is of the multichannel non-scanning type which includes a multiplicity of crystal video receiver channels. In this type of system, the outputs of the receiver channels are sent to amplitude selector circuits which use the receiver signals to determine the angle of arrival of incoming radar signals. However, in the prior art, there exist limitations in the type of multichannel receiver system in that the sensitivity in each of the receiver channels is not adequate unless there is provided a separate radio frequency amplifier for each of the receiver channels.

In accordance with the present invention, the sensitivity of each of aforesaid receiver channels is improved substantially without incorporating separate r-f amplifiers in each of the receiver channels. A master receiver channel with an r-f amplifier is utilized. Incoming signals received in the master channel are single sideband modulated. The single sideband modulated output aignal is used as a local oscillator signal and mixed with the received incoming signal of each individual receiver channel. Utilizing the present system, a sensitivity of −70 dbm has been attained over a two to one frequency band without tuning.

It is a primary object of this invention to provide a multiplicity of sensitive receivers for a direction finding system.

It is another object of this invention to provide a multichannel direction finding system including a multiplicity of sensitive receiver channels wherein a master receiver channel generates a local oscillator signal for each receiver channel.

A still further object of the present invention is to provide a multichannel non-scanning direction finding system including a multiplicity of receiver channels wherein a signal in a master receiver channel is single sideband modulated and then applied as a local oscillator signal to each receiver channel.

The novel features which I believe to be characteristic of my invention are set forth with particularity in the appended claims. My invention itself, however, together with further objects and advantages thereof can best be understood by reference to the following description taken in connection with the accompanying drawing.

Now referring to the drawing, there is shown a non-scanning multichannel direction finding system including a multiplicity of receiver channels and a single master channel.

The incoming radiant energy signals such as from a radar whose location is to be determined, are received by way of antennas 10–23. The antennas may be positioned at equal intervals around a circle whose diameter may be several times the operating wavelength, for example, four times the operating wavelength. An antenna arrangement of this character is shown and described in U.S. Pat. No. 3,047,864 issued to D. Byatt, July 31, 1962. There is also provided omnidirectional antenna 6 which may be positioned in close proximity to antennas 10-23. There may also be utilized antennas having solely directional characteristics.

There is provided master channel 5 which is comprised of antenna 6, radio frequency amplifier 7, single sideband modulator 8, and modulating source 9. The incoming radiant energy signal received by way of antenna 6 is passed through radio amplifier 7 and fed to single sideband modulator 8 which also simultaneously receives a signal from modulating source 9. Modulating source 9 may be an oscillator operating at a preselected frequency. Balanced modulation is utilized in order to reject noise due to the generation of the local oscillator signal. The single sideband balanced modulator may be of the type shown and described at pages 541–544 of Terman's "Electronic and Radio Engineering" published in 1955 by McGraw-Hill Book Company, Inc. It is to be noted that single sideband modulation is utilized particularly where the time delay in master channel 5 may vary from that in the other receiver channels by time approaching an r-f cycle or greater.

The radiant energy incoming signal received by way of antennas 10–23 are fed to mixers 24–37, respectively. Simultaneously therewith, mixers 24-37 also receive the single sideband modulated output signal from modulator 8. The output signals from mixers 24–37 are fed to detectors 52-65 by way of intermediate frequency amplifiers 38–51, respectively. The signals from detectors 52–65 are applied simultaneously to amplitude selector 80 by way of video amplifiers 66-79, respectively. It has been noted previously that in the prior art of multichannel non-scanning direction finding systems that outputs of receiver channels are sent to amplitude selectors which use the receiver signals to determine the arrival of incoming radar signals and amplitude selector 80 may be utilized for the same purposes herein. Amplitude selector 80 may be of the type shown and described in U.S. Pat. No. 2,783,457 issued in 1957 to Flanagan.

There is thus provided a method and apparatus for improving the sensitivity in a multichannel non-scanning receiver without the use of an r-f amplifier in every channel. A master channel having high gain characteristics amplifies incoming radiant energy signals from a source whose direction is to be determined. The amplified signal is modulated at the intermediate frequency (single sideband modulation is utilized as the time delay in the master channel may vary from that in the other channels by times approaching an r-f cycle or greater). This signal is then applied as a local oscillator signal to all other channels. Balanced modulation is provided for all modulation processes in order to reject noise due to generation of the local oscillator signal. With well balanced modulation, the sensitivity is limited only by the noise figure of the mixer and r-f amplifier and the bandwidths of the i.f. amplifier. With no real attempt at balancing a sensitivity of 70 dbm has been attained over a 2 to 1 frequency band without tuning and with a pulsed signal input.

While a specific embodiment has been shown and described it will be understood that various modifications may be made and developed without departing from the invention. The appended claims are therefore intended to cover any such modifications within the true spirit and scope of the invention.

What I claim as new and desire to secure by Letters Patent of the United States is:

1. A non-scanning multichannel direction finding receiver system to determine the direction of the source of an incoming radiant energy signal comprising a multiplicity of receiver channels; each of said receiver channels consisting of an antenna receiving said incoming radiant energy, a mixer connected to said antenna, an intermediate freguency amplifier interconnecting said mixer to a detector, a video amplifier receiving the output of said detector; and a master channel consisting of a separate antenna also receiving said incoming radiant energy signal, a radio frequency amplifier connected to said separate antenna, an oscillator of preselected frequency, a single sideband balanced modulator simultaneously receiving a continuous wave signal from said oscillator and the output signal from said radio frequency amplifier, the output signal from said modulator being received by each of said mixers.

2. A non-scanning multichannel direction finding receiver system to determine the direction of the source of an incoming radiant energy signal comprising a master channel including an antenna receiving said incoming radiant energy signal, said master channel operating to amplify and single sideband modulate said incoming radiant signal, and a multiplicity of receiver channels, each of said receiver channels including a mixer connected to an associated antenna to receive said incoming radiant energy signals, said single sideband modulated signal also being received by each of said mixers.

3. A non-scanning multichannel direction finding receiver system comprising a multiplicity of antennas, said antennas having directional characteristics, a separate omnidirectional antenna, each of said antennas receiving incoming radiant energy from a source whose direction is to be determined, a radio frequency amplifier connected to said omnidirectional antenna, an oscillator, operating at a preselected frequency, a balanced single sideband modulator simultaneously receiving signals from said oscillator and said radio frequency amplifier, a mixer connected to each of said directional antennas, said mixer also receiving a modulated signal from said modulator, an intermediate frequency amplifier to amplify the output signal from each mixer, a detector connected to the output of each intermediate frequency amplifier, and a video amplifier receiving each of the detected signals.

4. A non-scanning multichannel direction finding receiver system comprising a multiplicity of antennas, said antennas having directional characteristics, a separate omnidirectional antenna, each of said antennas receiving incoming radiant energy from a source whose direction is to be determined, a radio frequency amplifier connected to said omnidirectional antenna, an oscillator, operating at a preselected frequency, a balanced single sideband modulator simultaneously receiving signals from said oscillator and said radio frequency amplifier, a mixer connected to each of said directional antennas, said mixer also receiving a modulated signal from said modulator, an intermediate frequency amplifier to amplify the output signal from each mixer, a detector connected to the output of each intermediate frequency amplifier, a video amplifier receiving each of the detected signals, and an amplitude selector receiving a multiplicity of video amplified signals and providing an output signal representative of the maximum input signal thereto.

5. A non-scanning multichannel direction finding receiver system to determine the direction of the source of an incoming radiant energy signal comprising a multiplicity of receiver channels, each of said receiver channels including a mixer having an associated antenna receiving said incoming radiant energy signal, an intermediate frequency amplifier interconnecting said mixer to a detector and a video amplifier receiving the output signal from said detector; and a master channel including a radio frequency amplifier having an associated antenna to receive said incoming radiant energy signal, balanced means to single sideband modulate the output signal from said radio frequency amplifier, said modulated signal also being received by each of said mixers.

6. A non-scanning multichannel direction finding receiver system to determine the direction of the source of an incoming radiant energy signal comprising a multiplicity of receiver channels, each of said receiver channels including a mixer having an associated antenna receiving said incoming radiant energy signal, an intermediate frequency amplifier interconnecting said mixer to a detector and a video amplifier receiving the output signal from said detector; a master channel including a radio frequency amplifier having an associated antenna to receive said incoming radiant energy signal; balanced means to single sideband modulate the output signal from said radio amplifier, said modulated signal also being received by said mixers; and means to select the maximum output signal from each of said video amplifiers.

* * * * *